Feb. 28, 1950   W. A. BILLINGS   2,498,644
METHOD OF MANUFACTURING A METAL TO GLASS SEAL
Filed Aug. 2, 1946
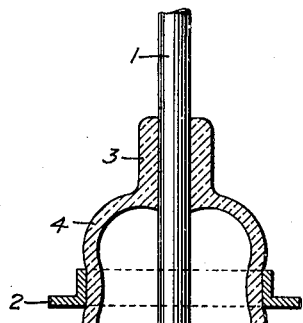
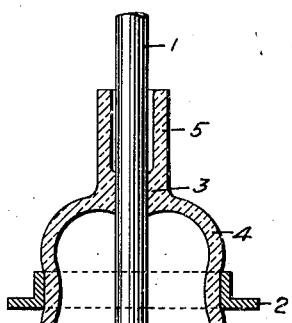
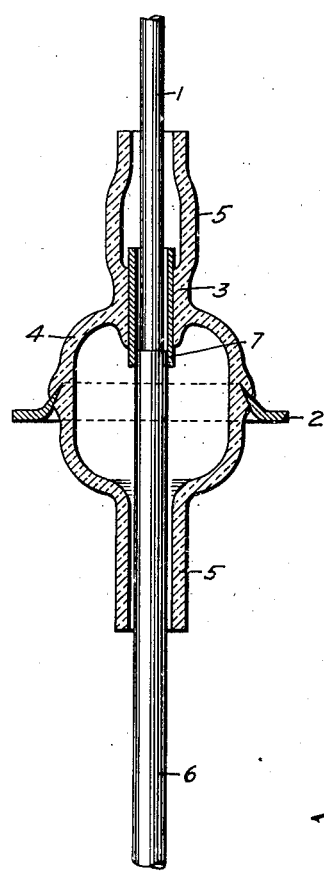
INVENTOR
WILLIAM A. BILLINGS
ATTORNEY Patented Feb. 28, 1950

2,498,644

UNITED STATES PATENT OFFICE 2,498,644

METHOD OF MANUFACTURING A METAL TO GLASS SEAL

William Alfred Billings, London, England, assignor to International Standard Electric Corporation, New York, N. Y., a corporation of Delaware Application August 2, 1946, Serial No. 687,929
In Great Britain June 15, 1945

Section 1, Public Law 690, August 8, 1946
Patent expires June 15, 1965

8 Claims. (Cl. 49—81)

It is the purpose of this invention to provide means whereby current carrying-conductors may be sealed in a vacuum tight manner through an envelope of metal in such a way that the conductor may be operated at substantial voltage with respect to the envelope, the invention providing for this in terms of clearance both within and without the exhausted envelope. It is further a purpose to provide such a sealed conductor in a form that will minimise the risk of the seal becoming cracked or broken through misuse or through the flexing in use of the conductor, or through the use of heat incidental to the use of such a conductor as in soldering of external leads to the apparatus using the seal.

The invention also provides means whereby the considerable clearances desired, and the corresponding relatively large size of the glass portion may be made readily by commonly known technique without resorting to large masses of glass with the consequent problems of strain inherent in large masses of glass.

According to the invention there is provided a method of manufacturing a metal to glass seal for sealing a conductor through the wall of a metal container comprising the steps of providing a ring of metal having an aperture whose diameter is substantially greater than that of said conductor sealing said conductor to a surrounding glass tube over a part only of the length of said tube, blowing a substantially spherical bulb from a further length of said tube adjacent said first part, and sealing said bulb to said circumferential ring of metal.

Three embodiments of the invention are shown in Figures 1, 2 and 3 respectively.

Referring to Figs. 1 and 2 a conductor member 1, of such material that it shall have approximately the same thermal expansivity as the glass to be used, has sealed to it a bead or short tube of glass 3. This bead is integral with, or part of a tube 5. The tube 5 is of such thickness that, by the application of heat and of relative pressures, it may be blown into what is substantially a hollow sphere as shown at 4. Member 2 which may be a flanged ring or may be a portion of the envelope which shall be the vaccum vessel, is held suitably and suitably heated, to seal the sphere 4 as it is blown, in a soft state, against member 2. The member 2 is of such metal as will have substantially the same thermal expansivity as the glass used or may be of different expansivity providing the sealing area is suitably proportioned, for example, as in the Housekeeper seal.

The tubular extension 5 to the sphere 4 is robust and provides a control to prevent movement by bending of end 6 of conductor 1, relative to the sealed portion 3, and prevents mechanical stresses at seal 3 such as would crack the seal. End 6 of conductor 1 is also at some distance from seal 3 and so minimises cracking from the soldering of the relatively heavy conductor 1.

It is possible to make the seal as shown in Fig. 3 when conductor 1 has brazed to it a thin cylinder 7, this cylinder providing the seal member on the Housekeeper principle. The flanged ring has the sealing edge thinned as in the Housekeeper seal. The arrangement of Fig. 3 shows a method whereby the results of Fig.1 and Fig. 2 can be achieved using metals whose thermal expansivities are not those of the glass used.

The hollow space within the glass member 4 may be filled with wax, pitch or other similar material as a precaution against condensation of moisture.

What is claimed is:

1. Method of manufacturing a metal to glass seal for sealing a conductor through an apertured wall of a metal container comprising the steps of providing a ring of metal having an aperture whose diameter is substantially greater than that of said conductor, sealing said conductor to a surrounding glass tube having a diameter substantially less than the diameter of said aperture over a part only of the length of said tube, blowing from said tube a substantially spherical bulb with a diameter approximately equal to that of said aperture, and sealing said bulb to said ring of metal.

2. Method of manufacturing a metal to glass seal as in claim 1, whereby there remains a substantial length of said tube adjacent said bulb and remote from said first seal for the purpose of protecting the sealed portions and said conductor from mechanical or thermal strains.

3. Method of manufacturing a metal to glass seal as in claim 1, whereby a substantial length of said tube remains adjacent said first seal and remote from said bulb.

4. Method of manufacturing a metal glass seal according to claim 1 in which said bulb is blown onto said ring of metal.

5. Method of manufacturing a metal to glass seal according to claim 1 in which said ring of metal is formed integrally with said container.

6. Method of manufacturing a metal to glass seal according to claim 1 which includes the steps of brazing to said conductor a thin metal cylinder and providing said first seal between said metal cylinder and said glass tube.

7. Method of manufacturing a metal to glass seal according to claim 1 which includes the steps of providing said ring with a thinned flange and providing said second seal between the thinned flange and said bulb.

8. Method of manufacturing a metal to glass seal according to claim 1 including the process of filling said bulb with a wax-like material as a precaution against condensation of moisture.

WILLIAM ALFRED BILLINGS.

REFERENCES CITED

The following references are of record in the file of this patent:

UNITED STATES PATENTS

| Number | Name | Date |
|---|---|---|
| 1,653,380 | Ulrey | Dec. 20, 1927 |
| 2,103,759 | Stupakoff | Dec. 28, 1937 |